United States Patent
Nakamichi et al.

(10) Patent No.: US 8,005,090 B2
(45) Date of Patent: Aug. 23, 2011

(54) QOS INFORMATION NOTIFICATION METHOD, COMMUNICATION APPARATUS AND INTER-DOMAIN SIGNALING APPARATUS FOR TRANSMITTING QOS INFORMATION OVER A MULTI-DOMAIN NETWORK

(75) Inventors: Koji Nakamichi, Kawasaki (JP); Akiko Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 614 days.

(21) Appl. No.: 11/448,926

(22) Filed: Jun. 7, 2006

(65) Prior Publication Data
US 2007/0217340 A1  Sep. 20, 2007

(30) Foreign Application Priority Data
Mar. 17, 2006  (JP) ................. 2006-075001

(51) Int. Cl.
*H04L 12/28* (2006.01)
(52) U.S. Cl. ............... 370/395.21; 370/395.2; 370/230; 370/238; 370/332
(58) Field of Classification Search ............ 370/252, 370/230, 395.2, 229, 238, 332
See application file for complete search history.

(56) References Cited

U.S. PATENT DOCUMENTS

| | | | | |
|---|---|---|---|---|
| 6,490,259 B1 * | 12/2002 | Agrawal et al. | ............... | 370/331 |
| 6,631,122 B1 * | 10/2003 | Arunachalam et al. | ....... | 370/332 |
| 6,683,853 B1 * | 1/2004 | Kannas et al. | ............... | 370/237 |
| 6,708,209 B1 | 3/2004 | Ebata et al. | | |
| 7,082,102 B1 * | 7/2006 | Wright | ............... | 370/229 |
| 7,180,866 B1 * | 2/2007 | Chartre et al. | ............... | 370/242 |
| 7,190,698 B2 * | 3/2007 | Svanberg et al. | .......... | 370/395.2 |
| 7,254,645 B2 * | 8/2007 | Nishi | ............... | 709/249 |
| 7,403,482 B2 * | 7/2008 | Izmailov et al. | ............... | 370/238 |
| 7,546,376 B2 * | 6/2009 | Widegren et al. | ............. | 709/232 |
| 7,636,781 B2 * | 12/2009 | Li et al. | ............... | 709/226 |
| 2001/0027484 A1 | 10/2001 | Nishi | | |
| 2002/0156914 A1 * | 10/2002 | Lo et al. | ............... | 709/238 |
| 2002/0174228 A1 | 11/2002 | Kanemaki et al. | | |
| 2003/0009580 A1 * | 1/2003 | Chen et al. | ............... | 709/231 |
| 2003/0103510 A1 * | 6/2003 | Svanberg et al. | ............ | 370/395.2 |
| 2004/0064541 A1 | 4/2004 | Ebata et al. | | |
| 2004/0153533 A1 * | 8/2004 | Lewis | ............... | 709/223 |

(Continued)

FOREIGN PATENT DOCUMENTS
JP  2001-111613 A  4/2001
(Continued)

OTHER PUBLICATIONS

Japan Patent Office: Japanese Office Action, mailed Aug. 24, 2010 for Japanese Patent Application No. 2006-075001, with partial English-language translation.

(Continued)

*Primary Examiner* — Ricky Ngo
*Assistant Examiner* — Dewanda Samuel
(74) *Attorney, Agent, or Firm* — Fujitsu Patent Center

(57) ABSTRACT

A QoS information notification method for transmitting QoS information over a multi-domain network includes steps of: (a) a first inter-domain signaling apparatus 11A transmitting QoS information to a first communication apparatus 13A; (b) the first communication apparatus 13A transmitting the received QoS information to a second communication apparatus 13B; (c) the second communication apparatus 13B transmitting to a second inter-domain signaling apparatus 11B the received QoS information and a route through which the received QoS information has passed; and (d) the second inter-domain signaling apparatus 11B associating the received QoS information with the received route.

11 Claims, 13 Drawing Sheets

U.S. PATENT DOCUMENTS

| | | | |
|---|---|---|---|
| 2006/0036719 A1* | 2/2006 | Bodin et al. | 709/223 |
| 2006/0123485 A1* | 6/2006 | Williams | 726/27 |
| 2007/0230363 A1* | 10/2007 | Buskens et al. | 370/252 |

FOREIGN PATENT DOCUMENTS

| | | |
|---|---|---|
| JP | 2001-282760 | 10/2001 |
| JP | 2002-344499 | 11/2002 |
| JP | 2003-224598 A | 8/2003 |

OTHER PUBLICATIONS

"Japanese Office Action", mailed out by the JPO on Jun. 8, 2010, in connection with JP Patent Application No. 2006-075001 Partial English Translation.

* cited by examiner

FIG.12

ROUTE INFORMATION FOR DESTINATION NETWORK #1

ROUTE INFORMATION FOR CLASS #1

| ROUTE INFORMATION | MAXIMUM BANDWIDTH | MAXIMUM DELAY |
|---|---|---|
| AS#1, AS#2, AS#3 | 30Mbps | 100ms |
| AS#1, AS#4, AS#5, AS#3 | 50Mbps | 200ms |
| AS#1, AS#4, AS#6, AS#7, AS#3 | 100Mbps | 1000ms |

CLASS #2

CLASS #3

QOS INFORMATION NOTIFICATION METHOD, COMMUNICATION APPARATUS AND INTER-DOMAIN SIGNALING APPARATUS FOR TRANSMITTING QOS INFORMATION OVER A MULTI-DOMAIN NETWORK

BACKGROUND OF THE INVENTION

1. Field of the Invention

The present invention generally relates to a QoS (Quality of Service) information notification method, a communication apparatus and an inter-domain signaling apparatus for transmitting QoS information over a multi-domain network.

2. Description of the Related Art

As the Internet has been playing an important role as a communication infrastructure, there are growing demands for QoS such as a bandwidth or a delay time for applications. For example, there are a growing number of broadband applications or services such as a video delivery application/service and a video conference application/service. However, because technologies for guaranteeing end-to-end QoS such as a bandwidth or a delay time have not been introduced into the Internet, telecommunication carriers and network providers try to avoid degradation of services by increasing data rate. Because it is necessary to increase bandwidths in order to increase data rate, it is desirable to guarantee QoS by allocating appropriate communication resources in response to the user's request. In addition, there are growing expectations for high quality VoIP (Voice over Internet Protocol) services over telecommunication carriers' networks. Thus, there are growing demands for providing a QoS service over the telecommunication carriers' networks, which is equivalent to the conventional circuit-switched telephone service rather than the conventional IP phone.

Further, when such high quality services are provided by the telecommunication carriers, there are also growing demands for the high quality services to be provided among different telecommunication carriers (i.e. domains). Communications among multiple domains occur when communication begins between physically separated terminals and passes through multiple telecommunication carriers. For example, such communication occurs when a user places an international TV phone call or when a user receives a video delivery service from a telecommunication carrier other than the user's subscribing telecommunication carrier. A network including multiple domains is referred to as a multi-domain network.

For a single-domain network, there have been developed many technologies for guaranteeing QoS for each of network technologies. For example, in the case of ATM (Asynchronous Transfer Mode), QoS is guaranteed by means of a virtual connection and a virtual path. In the case of IP (Internet Protocol), specifically Intserv defined by IETF (Internet Engineering Task Force), the bandwidth over IP networks is reserved by means of RSVP Protocol (Resource Reservation Protocol) for each session. In the case of Diffserv defined by IETF, although it is not possible to guarantee QoS for each session, it is possible to provide differentiated services by differentiating QoS for each group of flows.

On the other hand, for the multi-domain network, desired QoS is not always guaranteed, because of either different communication technologies for each domain or different mechanisms for providing the QoS service for each user. Therefore, on the user's request for QoS, network elements have to determine whether QoS can be guaranteed or not, and be configured depending on either communication technologies for each domain or mechanisms for providing the QoS service.

There are some technologies for guaranteeing QoS over such multi-domain network. Conventionally, when the network accepts a QoS request from the user, the QoS request is accepted sequentially for each domain, and then a resource is allocated to the QoS request. For example, Japanese Laid-Open Patent Application No. 2001-282760 (Reference 1) discloses a multi-domain service broker which configures QoS for each domain. Further, Japanese Laid-Open Patent Application No. 2002-344499 discloses an intermediate bandwidth allocation server which reserves a bandwidth along multiple service providers.

FIG. 1 shows a method of guaranteeing QoS in accordance with Reference 1. When a management apparatus (A) accept a QoS request from a user (S1), the management apparatus (A) requests the multi-domain service broker to send the instruction to management apparatuses in the other domains (S2). When the management apparatus (A) receives the response to the instruction (S3), it negotiates with the next management apparatus (B and/or C) in the other domain (S4). Then, each management apparatus makes a configuration for QoS (S5), the management apparatus (A) sends the response (S6), and communication is established (S7).

Thus, when constructing a QoS route over the multi-domain network, the management apparatus has to know which domains support a QoS service in advance. Typically, whether the domain supports the QoS service or not depends on the service policy for each domain. For this reason, it is expected that some of multiple domains do not provide the QoS service due to their service polices. In order to know which domains support the QoS service in advance, telecommunication carriers may exchange information on the availability or the content of the QoS service with each other. However, when one of the domains starts to support the QoS service, or when the content of the QoS service changes, for example, it is necessary to check activities among telecommunication carriers in order to exchange information, which results in taking time and costs for the checking activities.

SUMMARY OF THE INVENTION

In Reference 1, an operator inputs information on a QoS service (for example, an availability of a QoS service) for each domain into the multi-domain service broker in advance. Then the operator constructs a route with domains which support the QoS service. However, Reference 1 does not disclose concrete technologies in which the multi-domain service broker automatically collects information on the QoS service and information on the domain. Therefore, it is not possible to collect such information automatically.

Accordingly, the present invention may reduce time to collect information on the QoS service for each domain, when providing the QoS service over the multi-domain network.

An embodiment of the present invention may provide a QoS information notification method for transmitting QoS information over a multi-domain network, the multi-domain network including a first domain and a second domain, the first domain including a first communication apparatus and a first inter-domain signaling apparatus, the second domain including a second communication apparatus and a second inter-domain signaling apparatus, including:

(a) a first intra-domain transmitting step in which the first inter-domain signaling apparatus transmits QoS information to the first communication apparatus;

(b) an inter-domain transmitting step in which the first communication apparatus transmits the received QoS information to the second communication apparatus;

(c) a second intra-domain transmitting step in which the second communication apparatus transmits to the second inter-domain signaling apparatus the received QoS information and a route through which the received QoS information has passed; and (d) an inter-domain route constructing step in which the second inter-domain signaling apparatus associates the received QoS information with the received route.

An embodiment of the present invention may provide a communication apparatus connected to both a inter-domain signaling apparatus which manages QoS information on an internal domain and a communication apparatus in an external domain, including:

an information receiving unit configured to receive the QoS information on the internal domain from the inter-domain signaling apparatus;

an information message generating unit configured to add the QoS information on the internal domain to a message transmitted to the communication apparatus in the external domain;

an information extracting unit configured to receive a message from the communication apparatus in the external domain, and extract QoS information on the external domain and a route through which the received message has passed; and an information transmitting unit configured to transmit the extracted QoS information and the route to the inter-domain signaling apparatus.

Further, an embodiment of the present invention may provide an inter-domain signaling apparatus connected to a communication apparatus in an internal domain configured to transmit/receive a message to/from a communication apparatus in an external domain, including:

an information receiving unit configured to receive QoS information on the external domain from the communication apparatus; and an inter-domain route constructing unit configured to associate the received QoS information with a route through which the received QoS information has passed.

Thus, according to one embodiment of the present invention, it is possible to reduce time to collect information on the QoS service for each domain, when providing the QoS service over the multi-domain network.

BRIEF DESCRIPTION OF THE DRAWINGS

Other objects, features and advantages of the present invention will become more apparent from the following detailed description when read in conjunction with the accompanying drawings, in which:

FIG. 12 shows an another structure of route information for each service class stored in the inter-domain signaling apparatus.

DETAILED DESCRIPTION OF THE PREFERRED EMBODIMENT

A description is given below, with reference to the accompanying drawings, of embodiments of the present invention.

First Embodiment

With Regard to the Construction of a QoS Route

A first embodiment of the present invention enhances and utilizes a message used for a conventional signaling protocol such as a routing protocol, for the purpose of transmitting QoS information to the other domains. One example of such conventional signaling protocol is BGP (Border Gateway Protocol). BGP is used for exchanging route information among multiple domains, and notifying each other which route (network) is reachable. In the first embodiment, a route information update message (hereinafter called an UPDATE message) used for BGP is used to transmit QoS information among multiple domains. It is to be noted that NSIS (Next steps in Signaling), one of the signaling protocols used for QoS, can be used instead of BGP.

Figure 1:
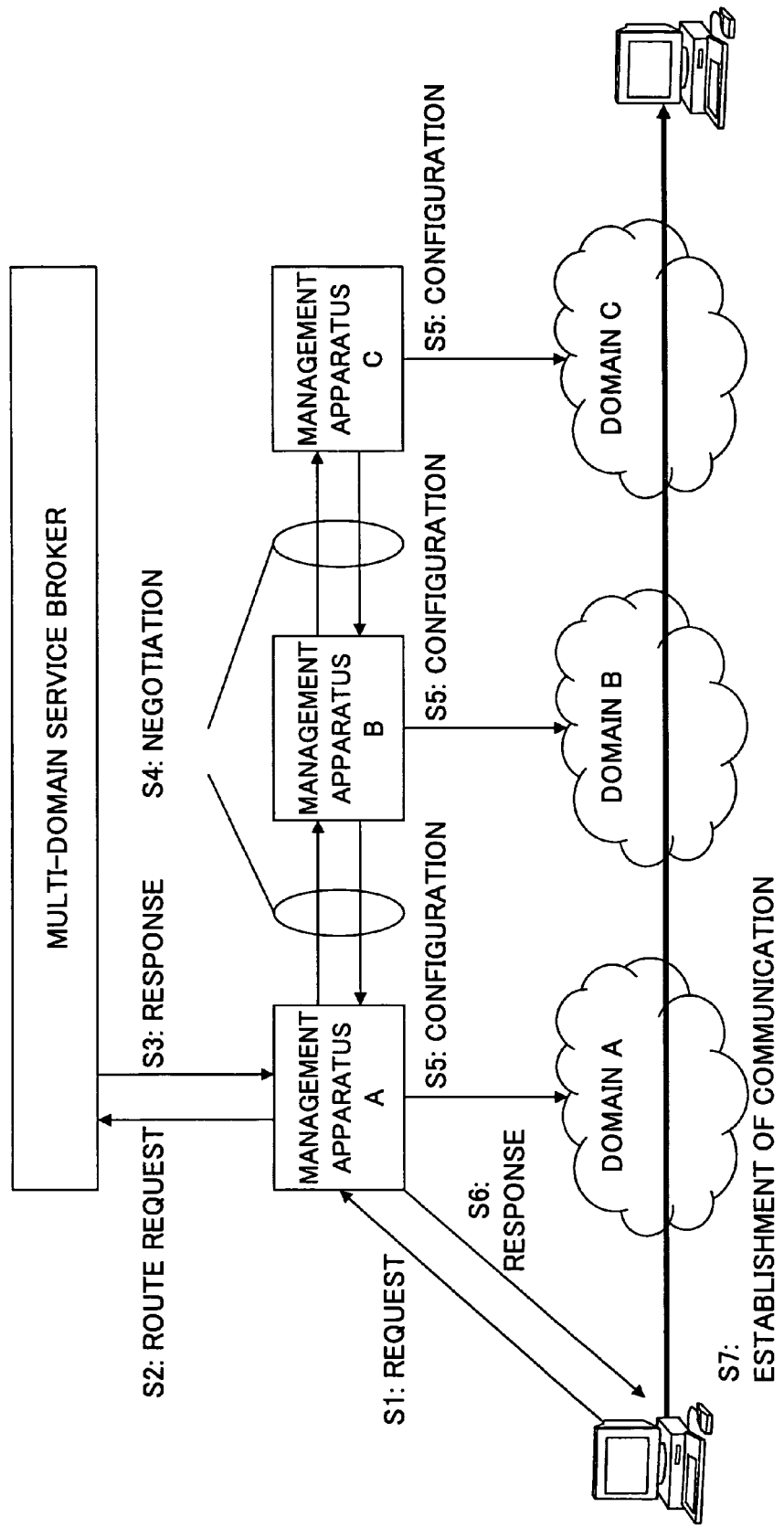
FIG. 1 shows steps of guaranteeing QoS in accordance with a related art technology.
Figure 2:
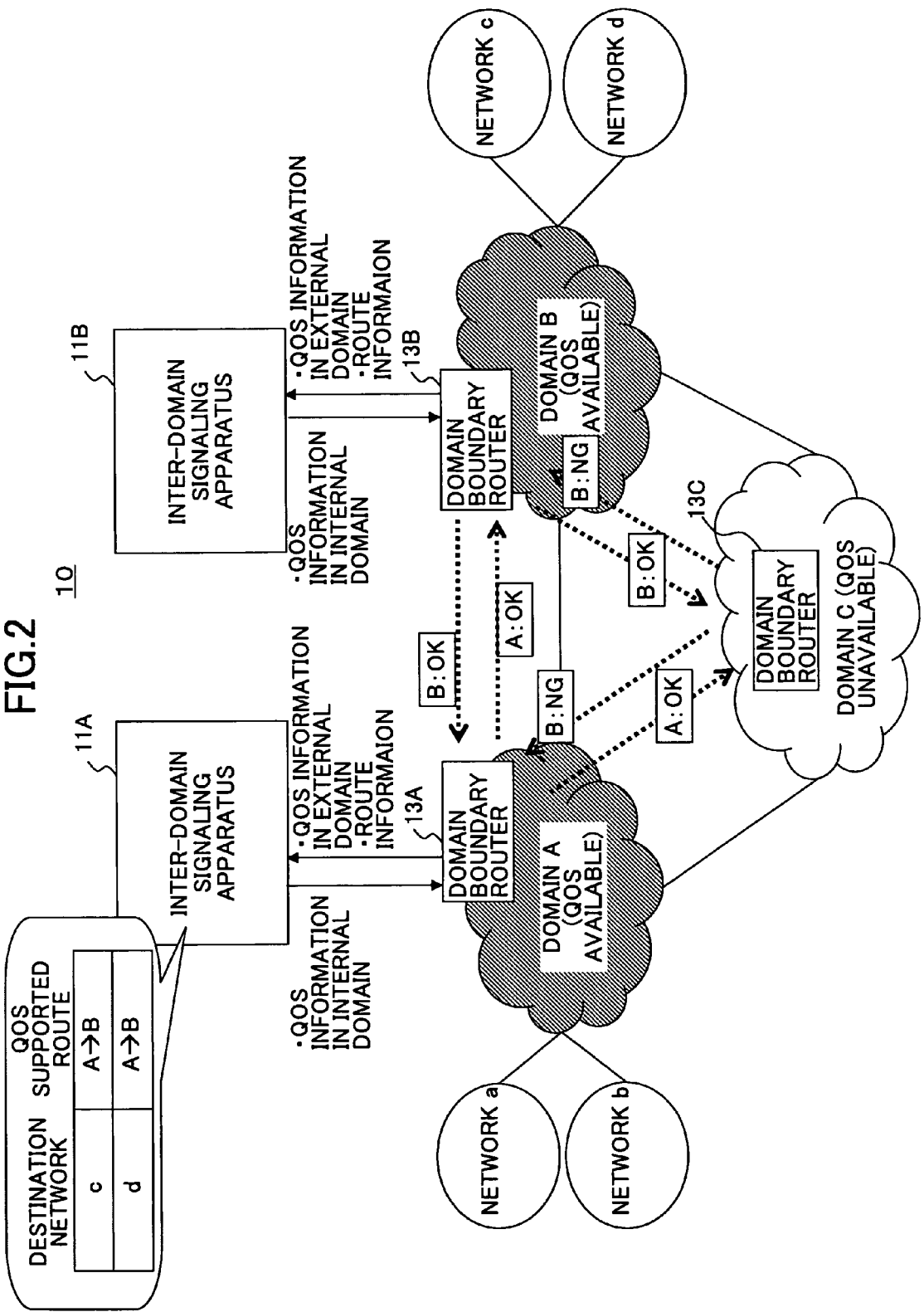
FIG. 2 shows a multi-domain network in accordance with one embodiment of the present invention.

FIG. 2 shows a multi-domain network 10 in accordance with one embodiment of the present invention. The multi-domain network 10 includes multiple domains A, B and C. Among them, the domains A and B support a QoS service (or a guaranteed service) and the domain C does not support the QoS service (or the guaranteed service). The domain A includes an inter-domain signaling apparatus 11A and a domain boundary router (BGP router) 13A. The domain B includes an inter-domain signaling apparatus 11B and a domain boundary router (BGP router) 13B. The domain C includes an inter-domain signaling apparatus 11C and a domain boundary router (BGP router) 13C.

Each of the inter-domain signaling apparatuses 11A and 11C manages QoS information (for example, an availability of a QoS service) in the internal domains (its own domain). The domain boundary routers 13A-13C transmit route information in accordance with BGP. In order for each of the inter-domain signaling apparatuses 11A and 11B to manage QoS information on both the internal domain (its own domain) and the external domains (the other domains), BGP which is a signaling protocol used among the domain boundary routers can be used.

Specifically, QoS information (for example, an availability of a QoS service) is added to the UPDATE message used for BGP. When the domain boundary router 13A transmits the UPDATE message with the QoS information to the domain boundary router 13B, the domain boundary router 13B understands that networks a and b are connected to the domain A and the domain A supports the QoS service. Then, the domain boundary router 13B can transmit such information (the UPDATE message) to the inter-domain signaling apparatus 11B. Further, the domain boundary router which receives the UPDATE message adds the UPDATE message to QoS information on the internal domain, and forwards the UPDATE message to the external domain.

On the other hand, when the domain boundary router 13A receives the UPDATE message from the domain boundary router 13B, the domain boundary router 13A understands that networks c and d are connected to the domain B and the domain B supports the QoS service. Further, the domain boundary router 13A understands that the domain C does not support the QoS service. Then, the domain boundary router 13A can transmit such information (the UPDATE message) to the inter-domain signaling apparatus 11A. The inter-domain signaling apparatus 11A can associate a route destined for the networks c and d with QoS information (the availability of the QoS service) through the route. Thus, the inter-domain signaling apparatus 11A can construct the route through which the QoS service from the internal domain to the destination is supported.

For the first embodiment shown in FIG. 2, QoS information is assumed to be the availability of the QoS service (guaranteed service). For the purpose of adding the QoS information to the message transmitted among the domain boundary routers, a user field in the message can be used, for example. The user field may be 1 in the case of the QoS service being available, and the user field may be 0 in the case of the QoS service being unavailable.

QoS information may include any information on the QoS service which can be made available in the domain, such as a service class or a priority class available for the QoS service, and/or performance data (a maximum available bandwidth, a maximum acceptable delay time, etc.). Using such QoS information allows for further understanding the QoS service available in each domain, or for providing a service class accordingly upon installing a path over the multi-domain network.

Figure 3:
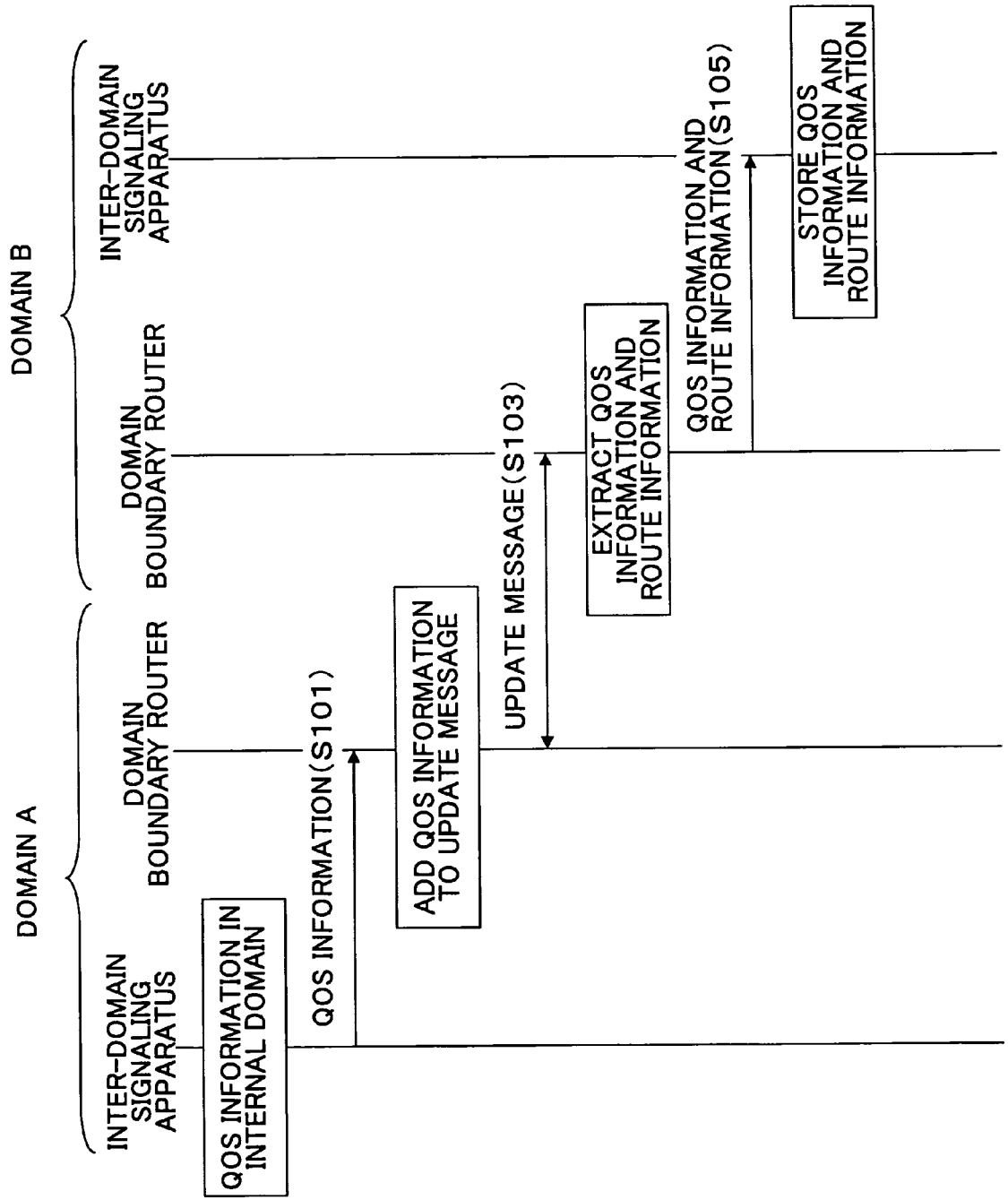
FIG. 3 shows a flowchart for constructing a QoS route over the multi-domain network in accordance with one embodiment of the present invention.

FIG. 3 shows a flowchart for constructing a QoS route over the multi-domain network.

The inter-domain signaling apparatus in the domain A has QoS information on the internal domain which has been input in advance. The inter domain signaling apparatus transmits the QoS information to the domain boundary router in the internal domain (S101). When the domain boundary router in the domain A receives the QoS information, the domain boundary router adds the QoS information to the message used for the signaling protocol among the domain boundary routers (for example, the UPDATE message used for BGP). Accordingly, the QoS information is transmitted to the domain boundary router in the domain B, along with the message used for the signaling protocol (S103). When the domain boundary router in the domain B receives the message from the domain A, the domain boundary router can understand the route through which the received message has passed. The domain boundary router in the domain B extracts the QoS information and the route from the message and sends them to the inter-domain signaling apparatus in the domain B (S105). The inter-domain signaling apparatus in the domain B associates the QoS information with the route. In this way, the route to the domain A and the QoS service available through the route can be associated each other.

Also, QoS information is transmitted in the reverse order, from the domain B to the domain A. Each domain of the multi-domain network can use the procedures shown in FIG. 3 to collect QoS information on the external domains automatically.

First Embodiment

With Regard to the Message Format Used for the Signaling Protocol

As a message format used for the signaling protocol, a description is given below with regard to the UPDATE message used for BGP.

As described above, QoS information includes an availability of a QoS service, a service class or a priority class available for the QoS service, and/or performance data such as a maximum available bandwidth or a maximum acceptable delay time. If the QoS information includes the availability of the QoS service, 1 bit in the message can be used to identify the QoS information. The QoS information may be automatically transmitted from a network management system to the inter-domain signaling apparatus, or may be input in the inter-domain signaling apparatus via a console terminal in advance by an administrator.

Figure 4:
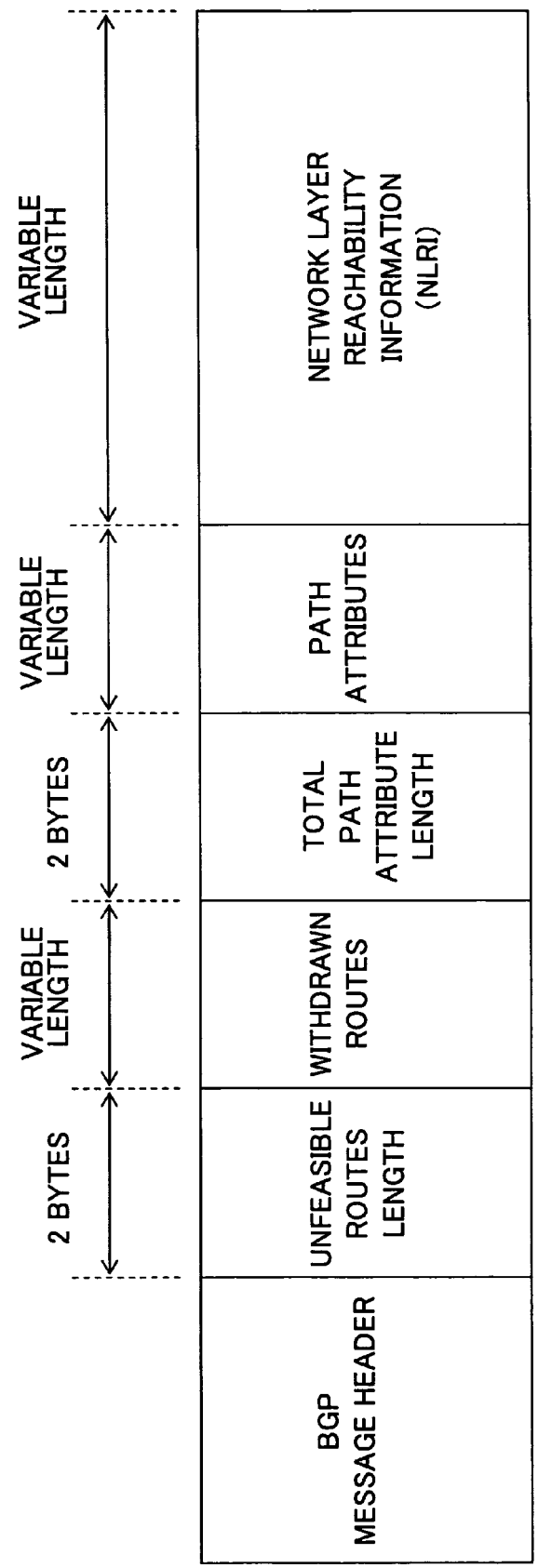
FIG. 4 shows an UPDATE message format used for BGP (Border Gateway Protocol)

FIG. 4 shows the UPDATE message format used for BGP. The UPDATE message includes a BGP Message Header field, followed by an Unfeasible Routes Length field (2 bytes), a Withdrawn Routes field (variable length), a Total Path Attribute Length field (2 bytes), a Path Attributes field (variable length), and a Network Layer Reachability Information (NLRI) field (variable length). The Unfeasible Routes Length field specifies the length of the following Withdrawn Routes field. The Withdrawn Routes field is used for identifying unavailable routes. The Total Path Attribute Length field specifies the length of the following Path Attributes field. The Path Attributes field is used to identify a variety of information related to the route in BGP. Finally, the Network Layer Reachability Information (NLRI) field is used to identify available routes. Information on a new route (network) for example is stored in this NLRI field. The Path Attributes field may includes some types of attributes, such as an Origin attribute, an AS Path attribute, a NEXT Hop attribute, and a LOCAL_PRF attribute, which are used as necessary.

Figure 5:
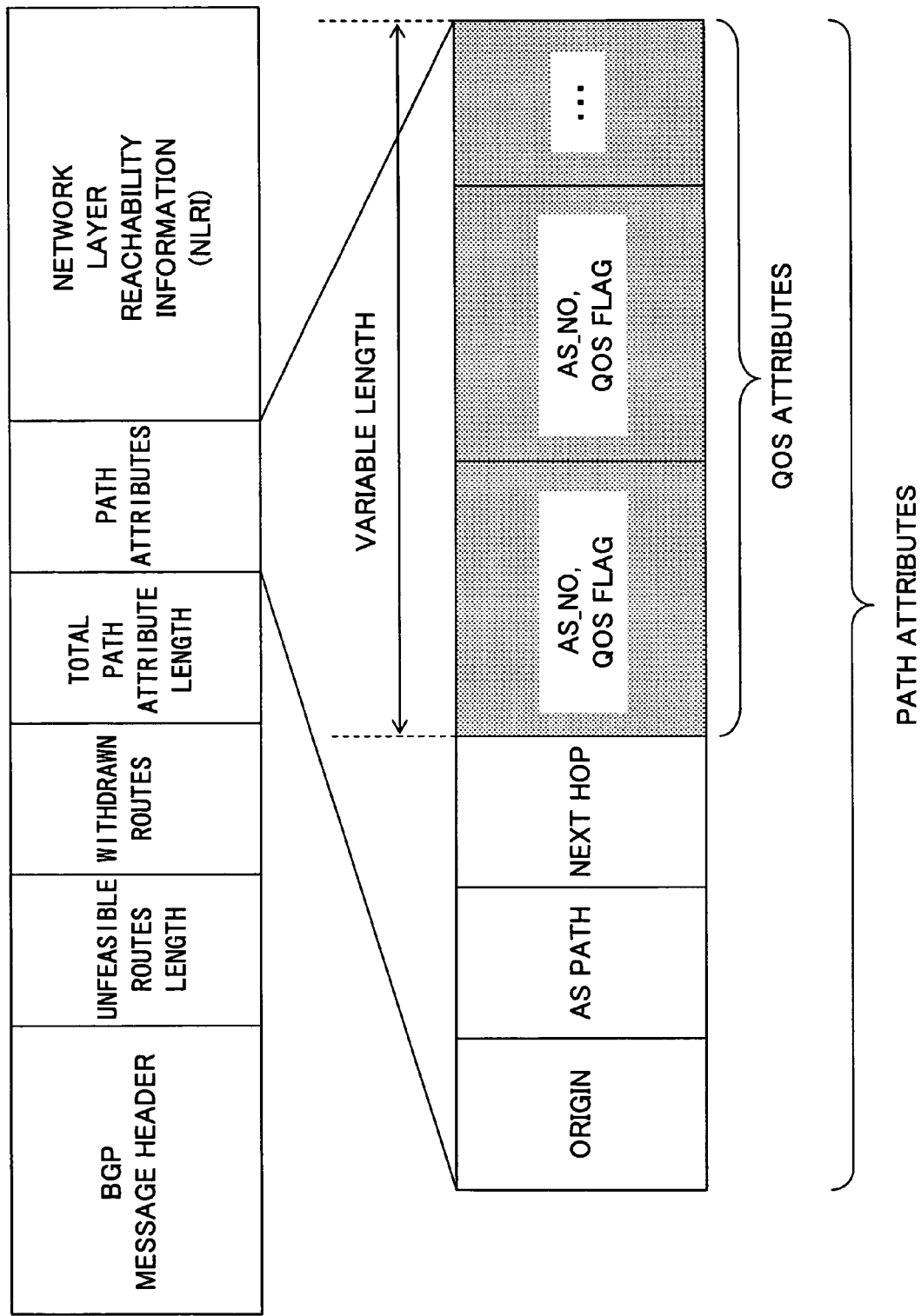
FIG. 5 shows a first configuration of QoS Attributes (Path Attributes)

The first embodiment defines a "QoS Attributes" field as a part of the Path Attributes field, for the purpose of adding QoS information to the UPDATE massage used for BGP and transmitting the QoS information to the external domain. FIG. 5 shows a first configuration of QoS Attributes. In the first configuration, the QoS Attributes field includes one or more fields which define an AS (Autonomous System) number (AS_no) and the availability of the QoS service in the domain with the AS number (QoS flag), for the purpose of identifying simply whether QoS (guaranteed service) is available in the domain or not.

Figure 6:
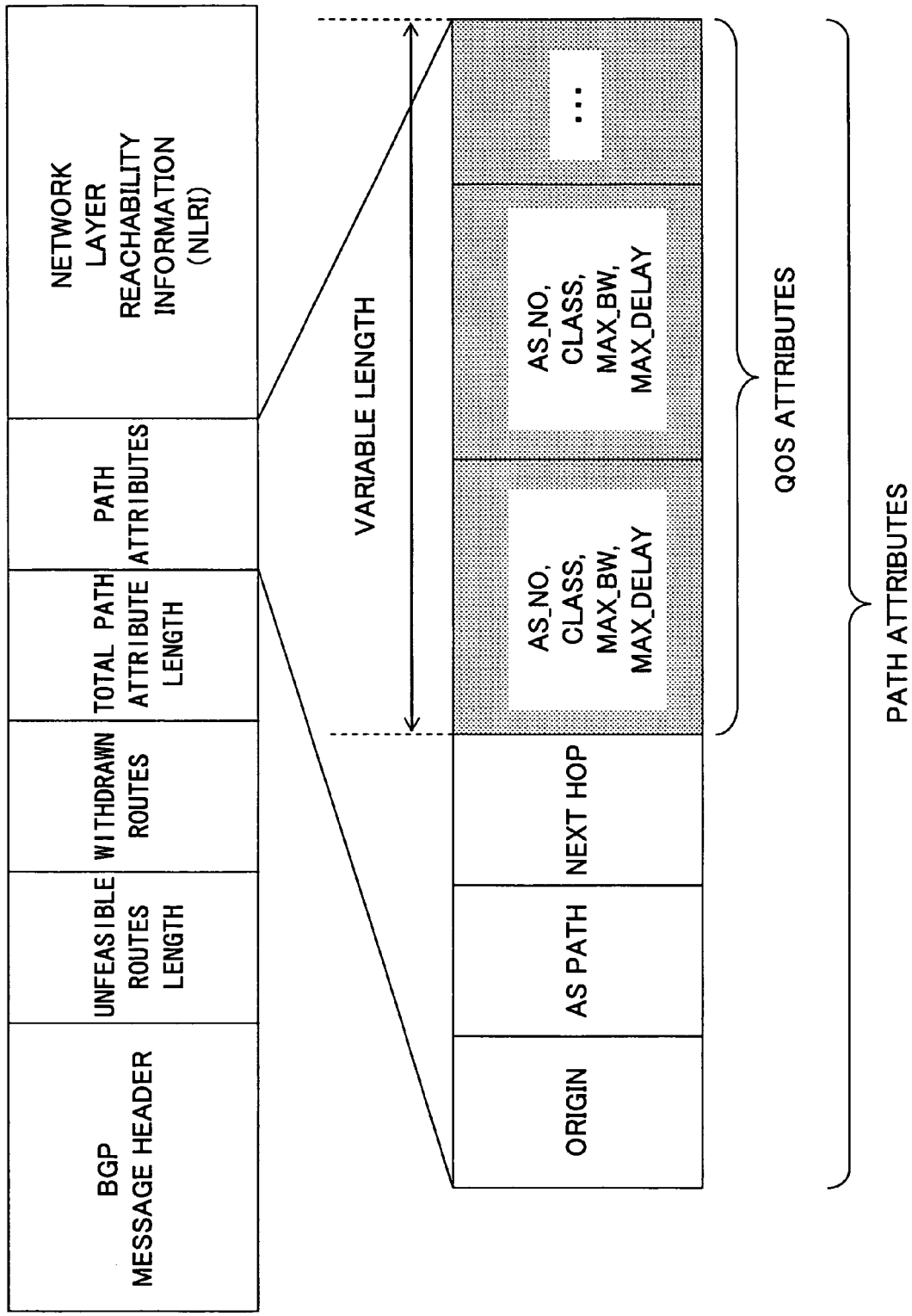
FIG. 6 shows a second configuration of QoS Attributes (Path Attributes)

FIG. 6 shows a second configuration of QoS Attributes. In the second configuration, the QoS Attributes field includes one or more fields which define an AS number (AS_no), a service class (or a priority class), a maximum bandwidth, and a maximum delay, for the purpose of identifying the QoS service available in the domain.

As shown in FIGS. 5 and 6, if QoS information is added to the UPDATE message used for BGP, BGP acts as usual. Specifically, although a domain boundary router which does not understand the above-defined QoS Attributes cannot transmit QoS information in the internal domain to the external domain and cannot understand QoS information received from the external domain, the domain boundary router can transmit the UPDATE message to a domain router in the external domain as usual.

First Embodiment

Figure 7:
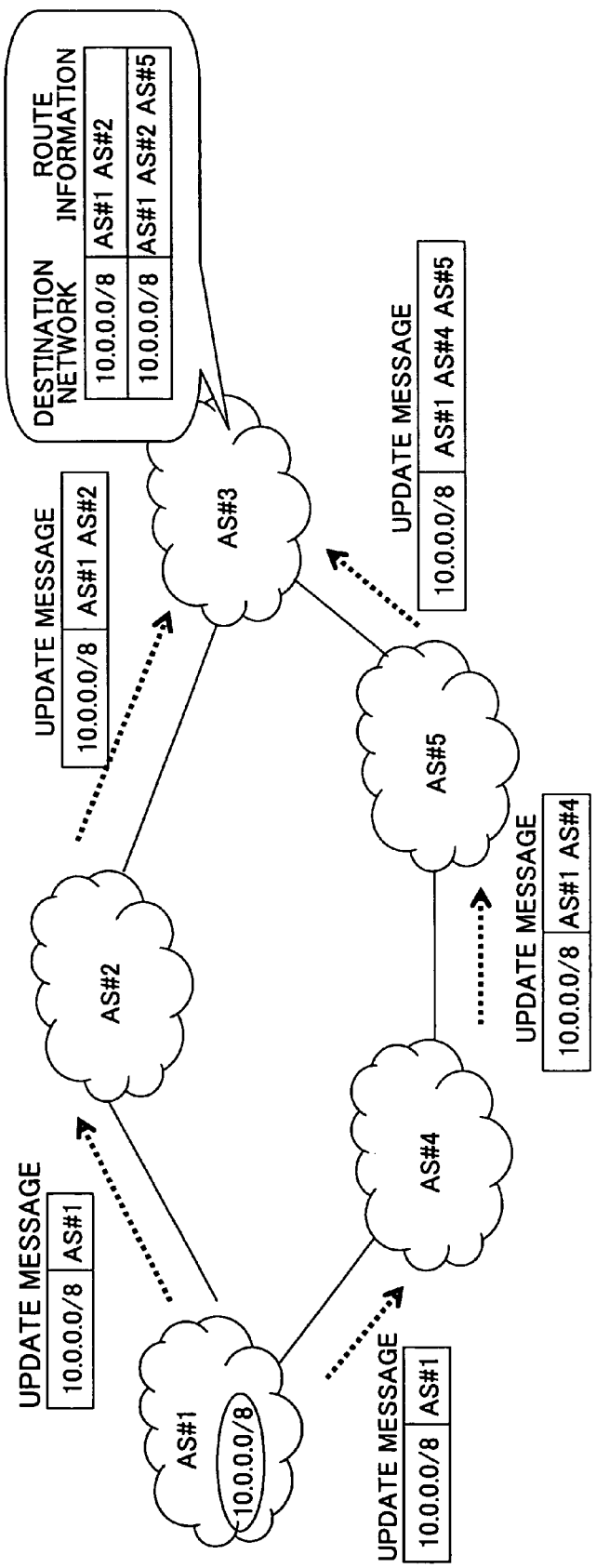
FIG. 7 shows a message flow for constructing route information.

With Regard to the Construction of Route Information Using the Message Used for the Signaling Protocol Next, a description is given below with regard to the construction of route information. For the purpose of constructing a route including domains which support the QoS service, conventional information transmitted in accordance with BGP is used. This conventional information is included in AS Path attributes, one of the Path Attributes in the UPDATE massage. The AS Path attributes list identifiers for the domains through which the UPDATE message has passed, in sequential order. FIG. 7 shows a message flow for constructing route information by means of the AS Path attributes. Assume that AS#1 includes a network 10.0.0.1/8, for example. A domain boundary router in AS#1 adds its AS number (AS#1) to the AS Path attributes in the UPDATE message used for BGP as an identifier for the domain, and sends the UPDATE message to neighbor domains AS#2 and AS#4. A domain boundary router in AS#2 receives the UPDATE message, adds its AS number (AS#2) to the AS Path attributes, and sends the UPDATE message to a neighbor domain AS#3. In the same way, a domain boundary router in AS#4 receives the UPDATE message, adds its AS number (AS#4) to the AS Path attributes, and sends the UPDATE message to a neighbor domain #AS5. Then, a domain boundary router in AS#5 sends the UPDATE message to the neighbor domain AS#3. In this way, each domain knows a route to the network 10.0.0.1/8 in view of the content of the AS Path attributes. In the network configuration shown in FIG. 7, there exist two routes from AS#3 to the network 10.0.0.1/8, AS#3-AS#2-AS#1 and AS#3-AS#5-AS#4-AS#1.

As described above for the first embodiment, QoS information added to the UPDATE message used for BGP and the AS Path attributes are exchanged among domains, for the purpose of constructing a route including domains which support the QoS service.

First Embodiment

With Regard to the Structure of the Domain Boundary Router

Figure 8:
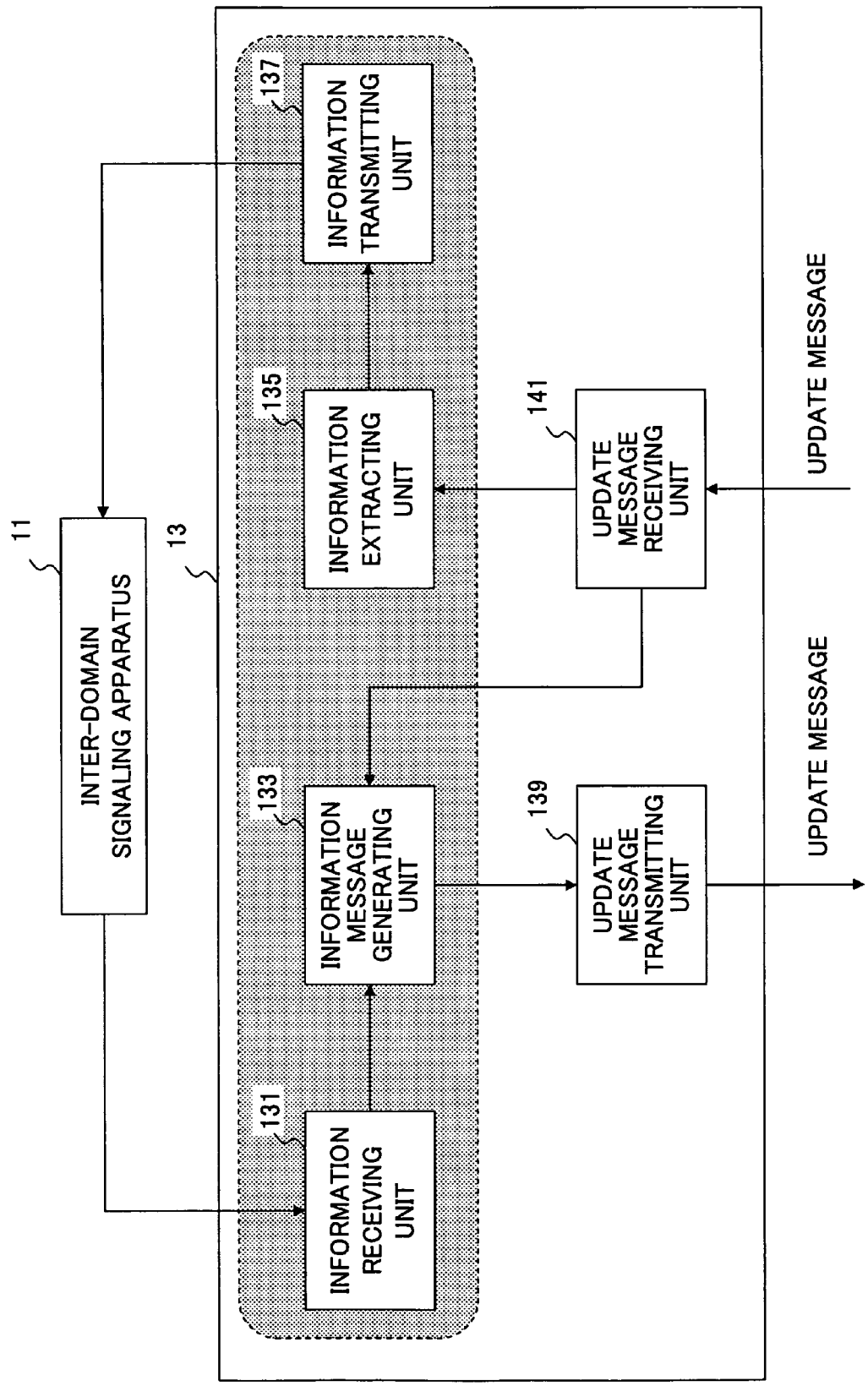
FIG. 8 shows a domain boundary router (BGP router) in accordance with one embodiment of the present invention.

Next, a description is given below with regard to the structure of the domain boundary router. FIG. 8 shows the domain boundary router 13 in accordance with one embodiment of the present invention.

The domain boundary router 13 includes an information receiving unit 131, an information message generating unit 133, an information extracting unit 135, an information transmitting unit 137, an UPDATE message transmitting unit 139, and an UPDATE message receiving unit 141.

The information receiving unit 131 receives QoS information in the internal domain from the inter-domain signaling apparatus 11. The information message generating unit 133 adds the QoS information in the internal domain to QoS Attributes in the UPDATE message, either when receiving the QoS information from the inter-domain signaling apparatus 11 after the installation of a new QoS service in the internal domain, or when receiving the UPDATE message from the external domain. If the new QoS service is installed in the internal domain, the information message generating unit 133 generates a new UPDATE message. The UPDATE message transmitting unit 139 transmits the UPDATE message to the domain boundary router in the external domain in accordance with conventional BGP.

The UPDATE message receiving unit 141 receives the UPDATE message in accordance with conventional BGP. The information extracting unit 135 extracts QoS information (QoS Attributes in the UPDATE message) and route information (AS Path attributes in the UPDATE message) from the received UPDATE message. The information transmitting unit 137 transmits the extracted QoS information and route information to the inter-domain signaling apparatus 11.

When QoS information is input to the inter-domain signaling apparatus 11, the QoS information can be transmitted to the domain boundary router 13, added to the UPDATE message used for BGP, and forwarded to the external domains together with route information (AS Path attributes). In addition, the domain boundary router 13 can extract QoS information in the external domains from the UPDATE message received from the external domains.

It is to be noted that the domain boundary router corresponds to a communication apparatus described in the claims.

First Embodiment

With Regard to the Structure of the Inter-Domain Signaling Apparatus

Figure 9:
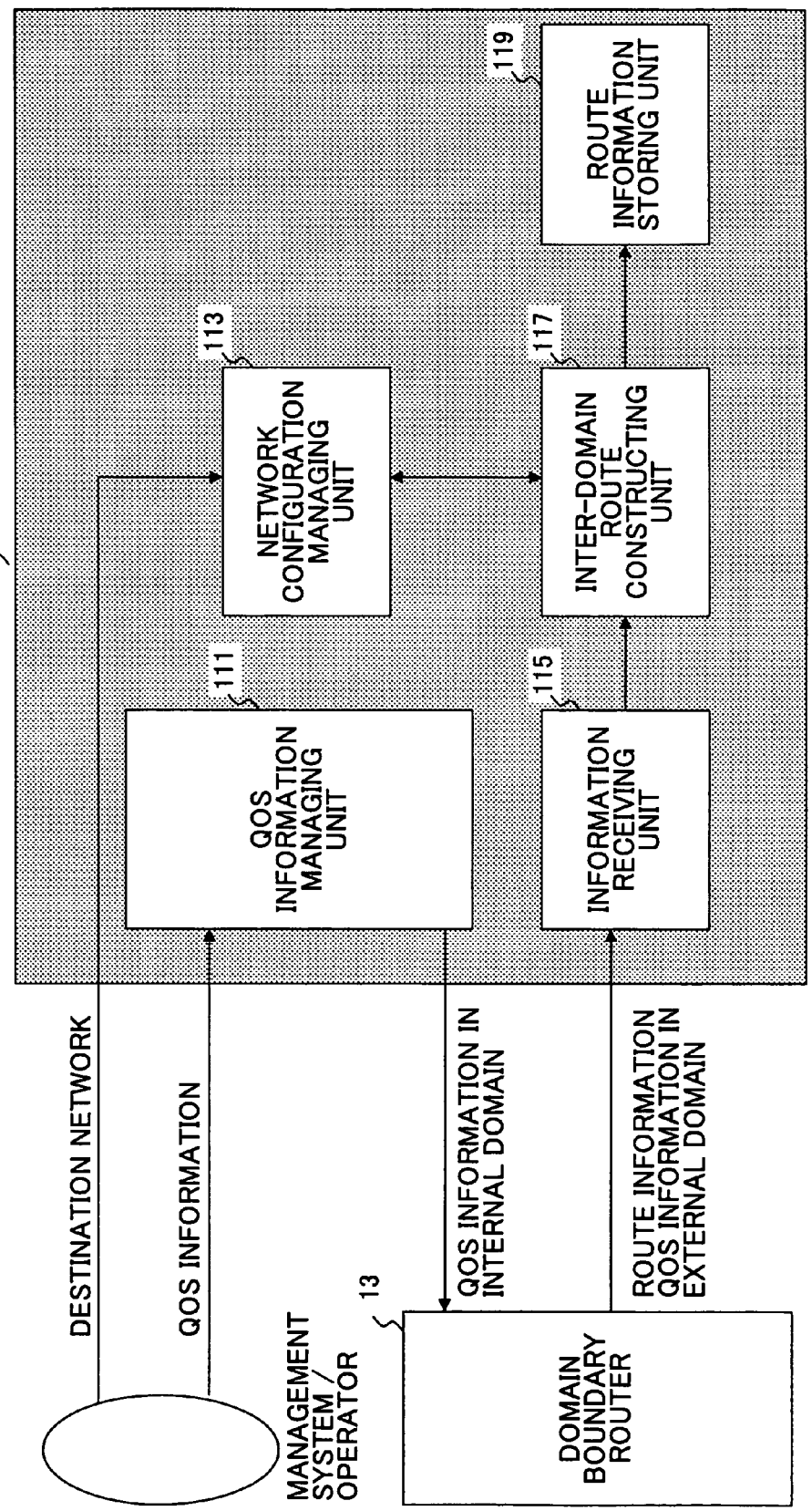
FIG. 9 shows an inter-domain signaling apparatus in accordance with one embodiment of the present invention.

Next, a description is given below with regard to the structure of the inter-domain signaling apparatus. FIG. 9 shows the inter-domain signaling apparatus 11 in accordance with one embodiment of the present invention.

The inter-domain signaling apparatus 11 includes a QoS information managing unit 111, a network configuration managing unit 113, an information receiving unit 115, an inter-domain route constructing unit 117, and a route information storing unit 119.

The QoS information managing unit 111 maintains QoS information in the internal domain. The QoS information is typically input from a management system connected to the inter-domain signaling apparatus 11. As mentioned above, the QoS information is transmitted to the domain boundary router in the internal domain. The QoS information may be transmitted to the domain boundary router at the time of being stored in the QoS information managing unit 111, or at the time of the inter-domain signaling apparatus 11 being instructed from the management system. The network configuration managing unit 113 stores information on a destination network for which a user has requested in its own domain. The inter-domain route constructing unit 117 refers to this information on the destination network upon constructing the route which supports the QoS service. The information receiving unit 115 receives QoS information and route information (AS Path attributes) from the domain boundary router in the internal domain. The inter-domain route constructing unit 117 associates the QoS information with the route information, selects the route which supports the QoS service, and stores the selected route in the route information storing unit 119.

Figure 10:
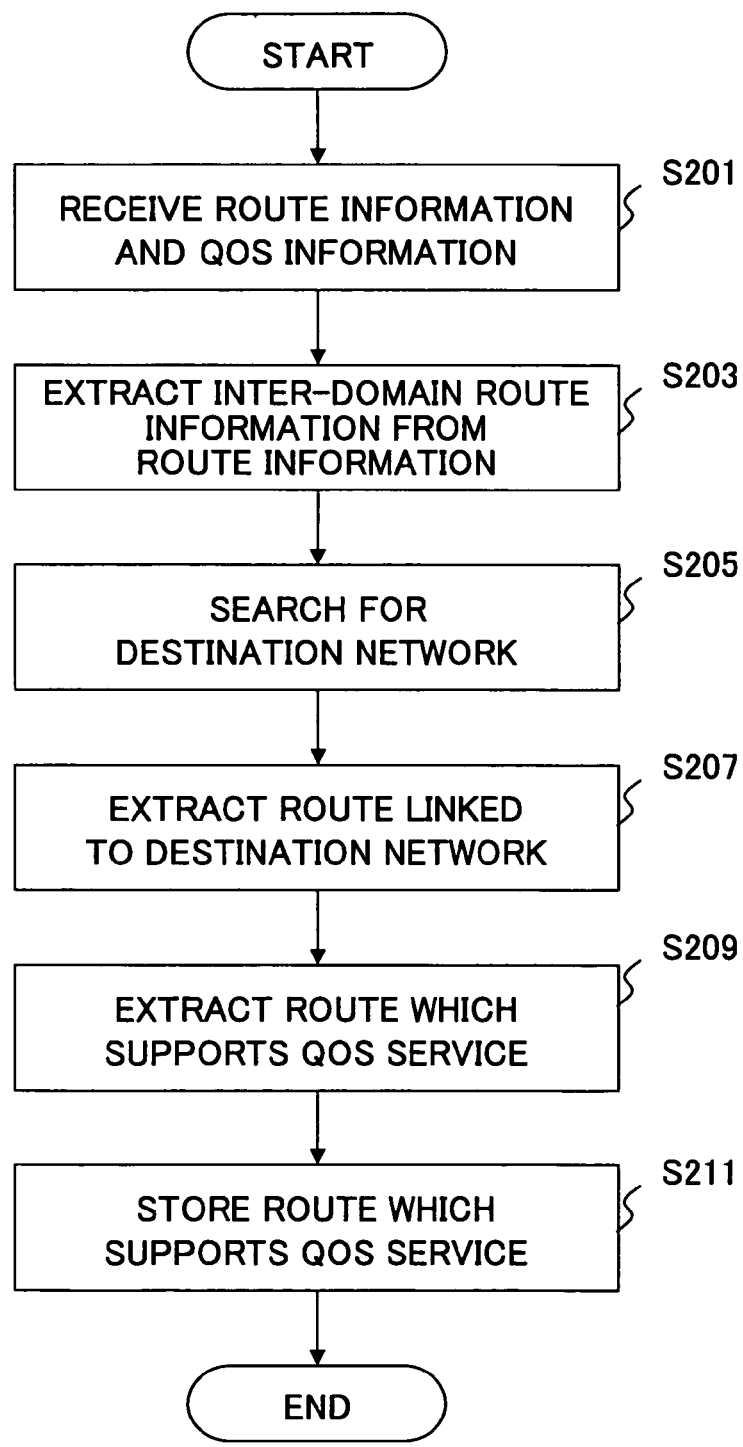
FIG. 10 shows a flowchart for constructing a route in the inter-domain signaling apparatus.

With reference to FIG. 10, a detailed description is given below with regard to steps of constructing a route in the inter-domain route constructing unit 117.

When the inter-domain route constructing unit 117 receives QoS information and AS Path attributes from the information receiving unit 115 (S201), it extracts inter-domain route information from the AS Path attributes (S203).

The inter-domain route information includes AS numbers in sequential order as shown in FIG. 7. The inter-domain route information may have multiple routes in accordance with the network configuration.

Next, the inter-domain route constructing unit 117 searches for the destination network stored in the network configuration managing unit 113 based on this inter-domain route information (S205), and extracts the route from the internal domain to the destination network (S207). Specifically, the inter-domain constructing unit 117 checks correspondence between route information (network addresses) in the AS Path attributes and the destination network (network address) stored in the network configuration managing unit 113. If the route information (network addresses) in the AS Path attributes includes the destination network (network address), this route information is stored as a route linked to the destination network. On the other hand, if the route information (network addresses) in the AS Path attributes does not include the destination network (network address), this route information is deleted.

Next, for each route linked to the destination network, the inter-domain route constructing unit 117 determines whether or not the inter-domain route information corresponds to a route which supports QoS service, based on QoS information (S209). Specifically, the inter-domain route constructing unit 117 determines the availability of QoS service for each domain in inter-domain route information, by checking whether each route in inter-domain route information supports the QoS service or not, with reference to the QoS information corresponding to the domain. Assume that 1 bit is used for QoS information in order to identify the availability of the QoS service (for example, 1='QoS available' 0='QoS unavailable'). If QoS information corresponding to any domain in the inter-domain route information is found to be QoS unavailable (=0), the inter-domain route information is deleted. In this way, inter-domain route information including only domains which support the QoS service can be finally extracted.

In some embodiments, a service class available for the QoS service is used as QoS information. In this case, the inter-domain route constructing unit 117 checks whether each route in inter-domain route information supports the service class or not, with reference to the QoS information. In this way, for each service class, inter-domain route information including only domains which support the service class can be extracted. Equally, a maximum available bandwidth or a maximum acceptable delay time can be used as QoS information.

Figure 11:
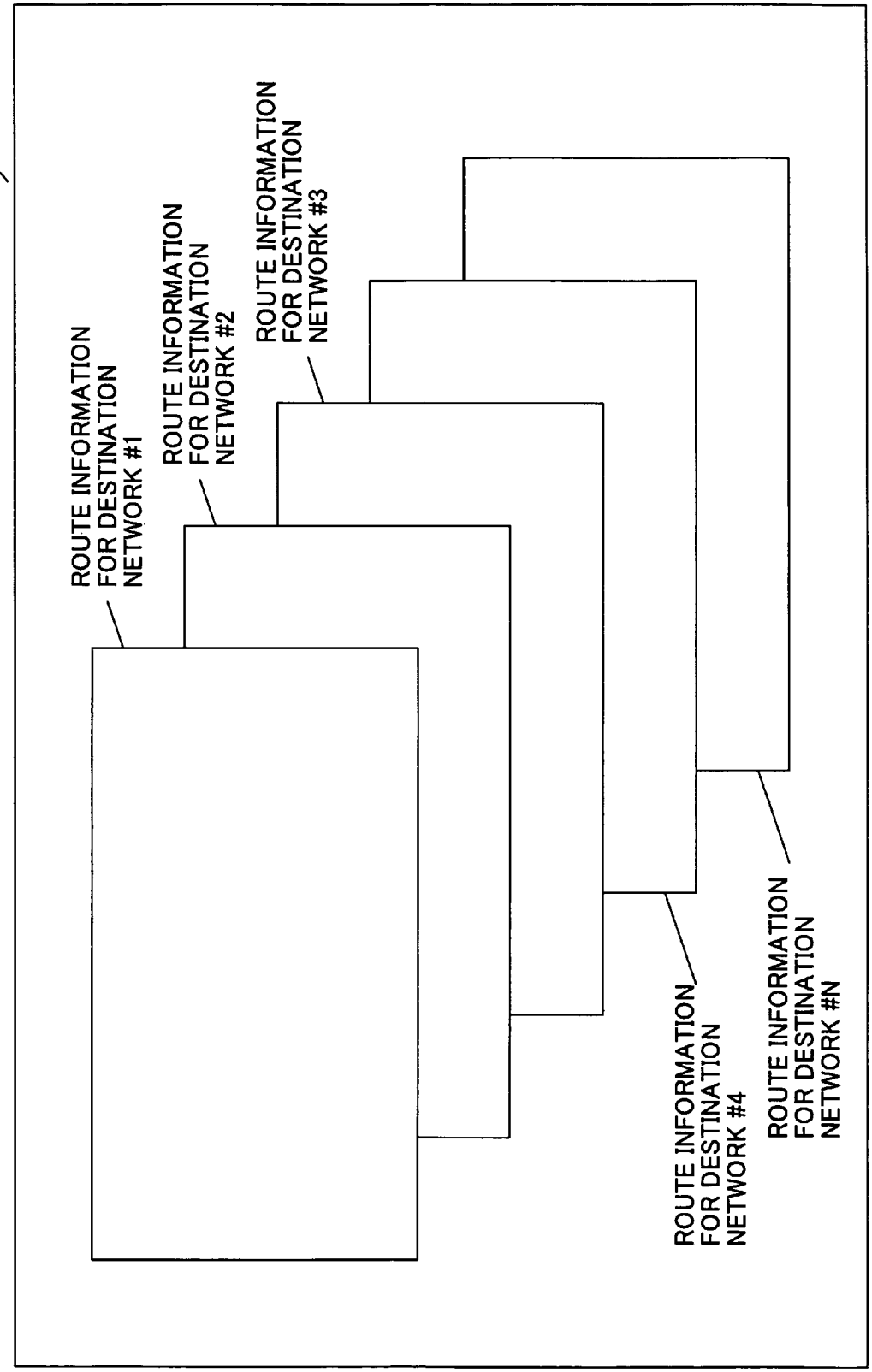
FIG. 11 shows a structure of route information stored in the inter-domain signaling apparatus.

The inter-domain route information extracted in the inter-domain route constructing unit 117 is stored in the route information storing unit 119. FIG. 11 shows a structure of route information stored in the route information storing unit 119.

If the availability of the QoS service is used as QoS information in the UPDATE message, the route information storing unit 119 classifies and stores route information extracted by the inter-domain route constructing unit 117 based on each destination network. For example, route information including only domains which support the QoS service to a destination network #1 can be stored as route information for the destination network #1.

If the service class, the maximum available bandwidth and the maximum acceptable delay time are used as QoS information in the UPDATE message, the route information storing unit 119 may further classify and store route information, the maximum available bandwidth and the maximum acceptable delay time based on each service class, as shown in FIG. 12.

Classifying route information as shown in FIGS. 11 and 12 allows the inter-domain signaling apparatus to easily determine which domains support the QoS service or which domains support the service class with reference to the information storing unit 119, upon installing a path over the multi-domain network.

Second Embodiment

As described in the first embodiment, each domain can automatically and quickly know the availability of the QoS service in the external domain. With the first embodiment, it is possible to provide a variety of flexible QoS services over the multi-domain network. One example of such QoS services is a multi-domain QoS service which provides a QoS path over the multi-domain network.

The multi-domain QoS service provides the QoS path as described below. A bandwidth is reserved among domains in advance, for the purpose of guaranteeing an end-to-end service among users. When the user requests a bandwidth with the QoS service, a request control server communicating with the user (corresponding to the inter-domain signaling apparatus) determines whether or not the bandwidth reserved among domains is sufficient to fulfill the requested bandwidth from the user, for the purpose of a request control. Accordingly, the request control server can quickly perform the request control, compared to each management system in each domain along the end-to-end route performing the request control each time the user requests the bandwidth. In this situation, for the purpose of reserving the bandwidth among domains in advance, it is necessary to know which domains support the QoS service. The present invention can be applied to such multi-domain QoS service.

In addition, in the multi-domain QoS service, the inter-domain signaling apparatus allocated to each domain transmits a bandwidth requesting message to the inter domain signaling apparatuses in its neighbor domains, for the purpose of reserving the bandwidth among domains in advance. The inter-domain signaling apparatus may be configured as a multi-domain QoS server which can make a configuration for QoS over the multi-domain network. The inter-domain signaling apparatus has to know the addresses of the inter-domain signaling apparatuses in its neighbor domains in advance, for the purpose of fulfilling the requested bandwidth over the multi-domain network. The conventional way for knowing the addresses of the inter-domain signaling apparatuses in the neighbor domains is, for example, to input the addresses via an operator using a network management system in advance. However, this requires input activities by the operator, which results in taking time. Therefore, the signaling protocol in the first embodiment can be used to collect the addresses of the inter-domain signaling apparatuses automatically. Specifically, the address of the inter-domain signaling apparatus is also added to the QoS Attributes field (part of the Path Attributes field in the UPDATE message used for BGP). When the UPDATE message is transmitted to each domain, the inter-domain signaling apparatus in each domain knows the address of the sending inter-domain signaling apparatus in the external domain.

As described above, adding the address of the inter-domain signaling apparatus together with QoS information to the UPDATE message allows for collecting the addresses of the inter-domain signaling apparatuses with the same structure as described in the first embodiment.

Figure 13:
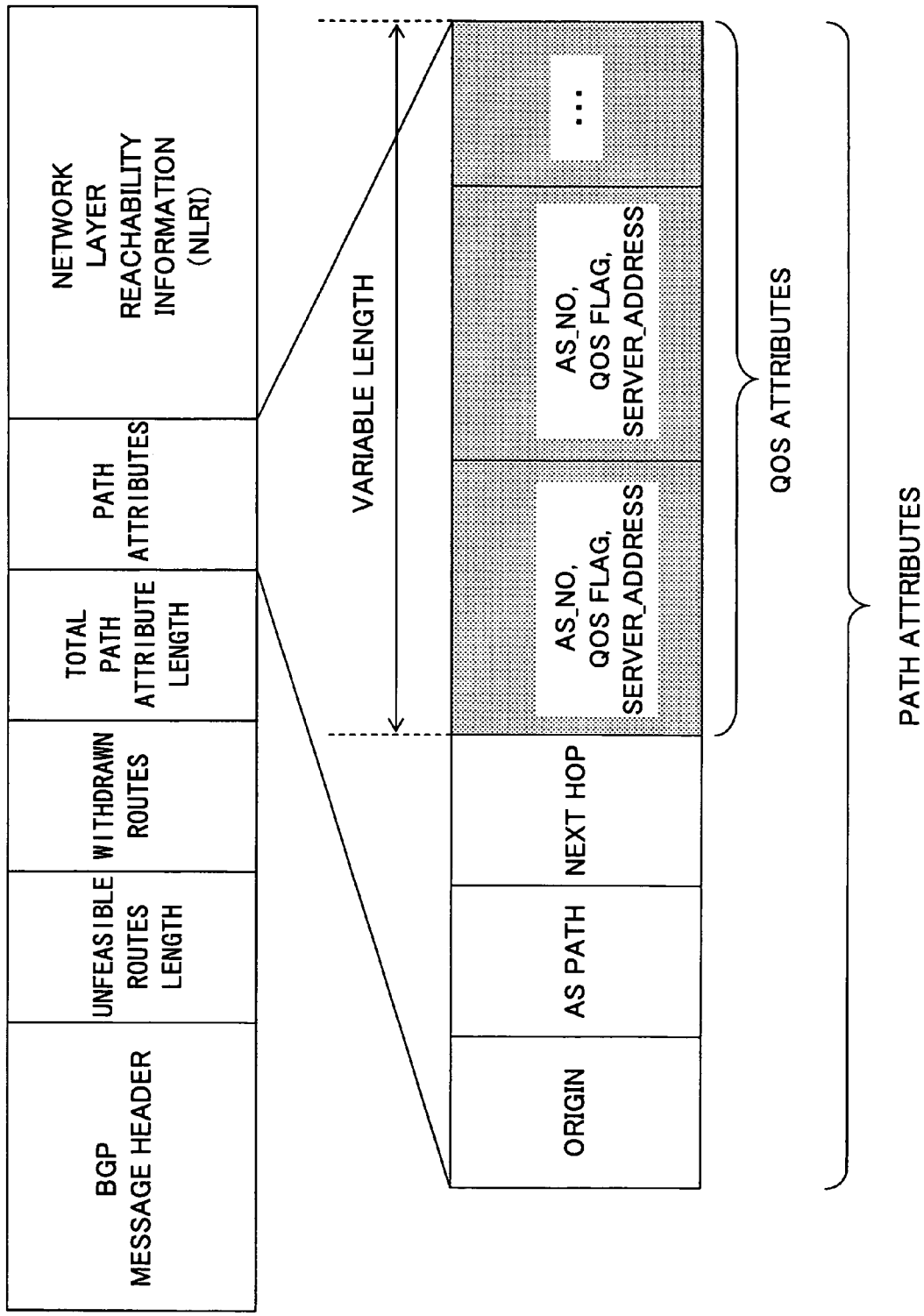
FIG. 13 shows a configuration of QoS Attributes (Path Attributes) in the case of including an address of the inter-domain signaling apparatus.

FIG. 13 shows a configuration of QoS Attributes in the case of including the address of the inter-domain signaling apparatus. The information message generating unit 133 in the domain boundary router as described in the first embodiment (FIG. 8) adds the address of the inter-domain signaling apparatus in the internal domain together with the AS number and the QoS flag to QoS Attributes, upon generating or updating the UPDATE message. When the domain boundary router in the external domain receives this UPDATE message, it can extract the address of the inter-domain signaling apparatus. Thus, the inter-domain signaling apparatus in each domain can collect the addresses of the inter-domain signaling apparatuses in the external domain automatically, by transmitting the address from the information transmitting unit 137 in the domain boundary router to the inter-domain signaling apparatus.

Accordingly, the inter-domain signaling apparatus can negotiate the requested bandwidth over the multi-domain network. It is to be noted that the inter-domain signaling apparatus which manages QoS information may be implemented as the same apparatus as the multi-domain QoS server, or implemented as an apparatus separate from the multi-domain QoS server.

Effect(s) of the First Embodiment and the Second Embodiment

According to the first embodiment of the present invention, the inter-domain signaling apparatus in each domain can construct a route including domains (inter-domain route) which support the QoS service automatically. This results in reducing time necessary for configuration activities or agreements among administrators. Additionally or alternatively, this results in reducing activities by the administrator in the case of either the domain starting to provide the QoS service or the domain changing its QoS service, by transmitting information on the QoS service to the inter-domain signaling apparatus in each domain.

According to the second embodiment of the present invention, the inter-domain signaling apparatus can collect the addresses of the inter-domain signaling apparatuses (or the multi-domain QoS servers) in the external domains automatically, in the case of reserving the bandwidth in advance over the multi-domain network. This allows for quickly negotiating the requested bandwidth upon providing the end-to-end QoS service through multiple domains.

The present invention is not limited to the specifically disclosed embodiments, and variations and modifications may be made without departing from the scope of the present invention.

The present application is based on Japanese Priority Patent Application No. 2006-075001, filed on Mar. 17, 2006, the entire contents of which are hereby incorporated by reference.

What is claimed is:

1. A QoS information notification method for transmitting QoS information over a multi-domain network, the multi-domain network including a first domain and a second domain, the first domain including a first communication apparatus and a first inter-domain signaling apparatus, the second domain including a second communication apparatus and a second inter-domain signaling apparatus, the QoS information notification method comprising:

(a) the first inter-domain signaling apparatus transmitting, in the first domain, QoS information to the first communication apparatus;

(b) the first communication apparatus transmitting, from the first domain, the received QoS information and an identifier for the first inter-domain signaling apparatus to the second communication apparatus of the second domain;

(c) the second communication apparatus transmitting, in the second domain, the received QoS information, a route through which the received QoS information has passed, and the identifier for the first inter-domain signaling apparatus to the second inter-domain signaling apparatus; and (d) the second inter-domain signaling apparatus associating the received QoS information with the received route in the second domain.

2. The QoS information notification method as claimed in claim 1, wherein:
the first communication apparatus transmitting (b) includes the first communication apparatus adding the received QoS information to a message used for a signaling protocol between the first communication apparatus and the second communication apparatus, and transmits the message to the second communication apparatus.

3. The QoS information notification method as claimed in claim 1, wherein:
the QoS information comprises at least one of:
an availability of a QoS service;
a service class available for a QoS service;
a maximum available bandwidth; and
a maximum acceptable delay time.

4. The QoS information notification method as claimed in claim 1, wherein:
the QoS information comprises an availability of a QoS service; and
the second inter-domain signaling apparatus associating (d) includes the second inter-domain signaling apparatus extracting and storing the route including a domain which supports the QoS service.

5. The QoS information notification method as claimed in claim 1, wherein:
the QoS information comprises a service class available for a QoS service; and
the second inter-domain signaling apparatus associating (d) includes the second inter-domain signaling apparatus checking whether the route from the first domain to the second domain supports the service class or not, and classifying and storing the route according to the service class once the route supports the service class.

6. A communication apparatus connected to both an inter-domain signaling apparatus which manages QoS information on a first domain and a communication apparatus in a second domain external to the first domain, comprising:
an information receiving unit configured to receive the QoS information on the first domain from the inter-domain signaling apparatus;
an information message generating unit configured to add the QoS information on the first domain and an identifier for the inter-domain signaling apparatus in the first domain to a message transmitted to the communication apparatus in the second domain, the message being used for a signaling protocol for the communication apparatus in the second domain, the signaling protocol being one of Border Gateway Protocol and Next steps in Signaling;
an information extracting unit configured to receive a message from the communication apparatus in the second domain, and extract QoS information on the second domain, a route through which the received message has passed, and an identifier for the inter-domain signaling apparatus in the second domain; and an information transmitting unit configured to transmit the extracted QoS information, the extracted route, and the extracted identifier for the inter-domain signaling apparatus in the second domain to the inter-domain signaling apparatus.

7. The communication apparatus as claimed in claim 6, wherein:
the QoS information comprises at least one of:
an availability of a QoS service;
a service class available for a QoS service;
a maximum available bandwidth; and
a maximum acceptable delay time.

8. An inter-domain signaling apparatus connected to a communication apparatus in a first domain configured to transmit/receive a message to/from a communication apparatus in a second domain external to the first domain, comprising:
an information receiving unit configured to receive, in the first domain, QoS information on the second domain, a route through which the received QoS information has passed, and an identifier for another inter-domain signaling apparatus in the second domain from the communication apparatus in the first domain, the QoS information and the identifier for the other inter-domain signaling apparatus in the second domain being transmitted from the other inter-domain signaling apparatus in the second domain via the communication apparatus in the second domain to the communication apparatus in the first domain; and an inter-domain route constructing unit configured to associate, in the first domain, the QoS information on the second domain, received by the information receiving unit, with the route through which the received QoS information has passed, received by the information receiving unit.

9. The inter-domain signaling apparatus as claimed in claim 8, wherein:
the QoS information comprises at least one of:
an availability of a QoS service;
a service class available for a QoS service;
a maximum available bandwidth; and
a maximum acceptable delay time.

10. The inter-domain signaling apparatus as claimed in claim 8, wherein:
the QoS information comprises an availability of a QoS service; and
the inter-domain route constructing unit extracts and stores the route including a domain which supports the QoS service.

11. The inter-domain signaling apparatus as claimed in claim 8, wherein:
the QoS information comprises a service class available for a QoS service; and
the inter-domain route constructing unit checks whether the route supports the service class or not, and classifies and stores the route according to the service class if the route supports the service class.

* * * * *